United States Patent Office 2,731,340
Patented Jan. 17, 1956

2,731,340

PHYSIOLOGICALLY VALUABLE XEROGELS AND MIXTURES CONTAINING THEM

Ernst Seifert, Kiel-Hammer, Germany, assignor, by mesne assignments, to Ernst Seifert, Kiel-Schulensee, and Heinz Lohmann, Cuxhaven, Germany No Drawing. Application April 22, 1952, Serial No. 283,759

Claims priority, application Germany April 28, 1951

4 Claims. (Cl. 71—52)

The present invention relates to physiologically valuable xerogels and mixtures containing them.

The present invention is based on the observation that physiologically valuable xerogels are obtained by reacting alkali silicate solutions, for example, sodium or potassium silicate solutions, with a mixture of alkaline earth metal salt and heavy metal salt solutions or suspensions (dissolutions) if required, with addition of silicates containing small quantities of alumina, to form the corresponding mixed silicates in the form of hydrogels (hydro silica gels), if necessary, freeing the reaction mixture by filtration and/or washing from the easily soluble salts formed by the reaction, and solidifying and drying the gel so obtained. (Compare the Examples 1–7.)

In this manner a drillable growth-accelerating mixture containing alkali-, earth alkali-, and heavy metal hydrosilicates (xerogels) is obtained in which, calculated on the amount of alkali silicate used for preparing the mixture, the amount of earth alkali and heavy metal present is equivalent to the alkali content.

To such hydrosilicates or xerogels phytohormones, synthetic or natural growth accelerating agents, for instance, from animal excrements or animal decomposition products, known as such, can be added whereby their growth accelerating effect is enhanced. Thus, for instance, water-soluble extracts from black peat, diluted solutions of phenylacetic acid, indolylacetic acid and other synthetic growth accelerating agents can be reacted with the hydrosilicates (xerogels) with formation of organic complex compounds.

It is also possible to obtain mixed fertilizers by combining the gels obtained according to the above described process with animal or human excretions, for instance, urine, guano or the like, or suitable sewage or municipal sewage purification plants or animal decomposition fluids. (Compare Example 8.)

It has also been found that the growth accelerating effect of a series of soil conditioners as, for instance, black peat, white peat, sea ooze, natural silicate deposits as marly clay, loess loam and marly fine sand, as well as basic slag poor in metal can be considerably enhanced by adding thereto the above-mentioned xerogels. For certain fields of application, for instance, for soils poor in bases or marshy soils the further addition of earth alkali carbonates is of special advantage.

Some mixtures of the above-mentioned kind are illustrated in Examples 9–10 which can be modified in various ways without exceeding the scope of the present invention.

Furthermore, it was found that xerogels of sea ooze or mixtures thereof with peat, peat soils or silicates containing alumina can be obtained by precipitation with metal salts, if required, under previous, simultaneous or subsequent addition of other metal salts which are not converted into the xerogel form. (Compare Examples 11 and 12.)

It is also possible to precipitate alkali silicates, sea ooze or mixtures of both products in the presence of metals in a finely divided state, especially in a particle size of less than 0.02 mm. diametre, if required, in admixture with peat, peat soils or silicates containing alumina, by the addition of metal salts. (Compare Examples 13–17.)

The xerogels and mixtures containing xerogels so obtained are distinguished by very good physiological effects on plants.

Government test result of the effect of a xerogel mixture of the following composition:

80 per cent. xerogel (Example 2a)
12 per cent. xerogel (Example 2b)
8 per cent. xerogel (Example 2c)

Yellow mustard was used in the comparison tests. Time of tests: September to October. Place of test: Kiel (Northern Germany). Fertilizing and comparative fertilizing see table.

YIELD IN DRY SUBSTANCE

| without fertilizer | NPK fertilizer | NPK fertilizer +xerogel |
|---|---|---|
| 100 per cent. | 144 per cent. | 215 per cent. |

The figures take into account the mean error margin. The gains lie beyond the limit of error.

The preparation of the gels and their mixtures is described in the following examples which can be modified according to the kind of substances used without changing the nature of the present invention.

The following examples illustrate the invention, the parts being by weight. The parts by weight and the parts by volume are related to each other as are kilograms to liters.

Example 1

A xerogel of general growth accelerating action and a strong biochemical effect is prepared in the following manner:

To 600 parts of potassium silicate solution (10.7 per cent. $K_2O$, 24 per cent. $SiO_2$), 400 parts of sodium silicate solution (11.9 per cent. $Na_2O$, 31 per cent. $SiO_2$), and 70 parts of magnesium carbonate (40 per cent. MgO), a solution of 30 parts of $KMnO_4$ in 4,000 parts of water is added and the whole is intimately mixed.

The mixture is treated in a mixing apparatus with a solution of 70 grams of $MgSO_4.7H_2O$ and 30 grams of $MgCl_2.6H_2O$ in 200 grams of water and mixed. After a short time of mixing, a hydrogel is formed which is air-dried at 50° C. The composition of the xerogel, ready for use, is as follows: 12 per cent. $K_2O$, 8.5 per cent. MgO, 3.1 per cent. $MnO_2$, 50.0 per cent. $SiO_2$ (calculated as oxides).

Example 2

*Mixture of several xerogels.*—(a) Preparation of the xerogel: The following substances and solutions are mixed: 430 parts of pure river sand, 70 parts of clay (kaolin, bentonite), 250 parts of potassium silicate (10.7 per cent. $K_2O$, 24 per cent. $SiO_2$), 150 parts of sodium silicate (11.9 per cent. $Na_2O$, 31 per cent. $SiO_2$), 50 parts of $MnCO_3$, suspended in 50 parts of water.

The following substances and solutions are mixed and then added to the above mixture while thoroughly stirring: 150 parts of gypsum ($CaSO_4$) and 25 parts of $ZnSO_4.7H_2O$, dissolved in 37.5 parts of water.

The hydrogel so formed is dried in the air at 50° C. and ground. The metal compounds of the xerogel (a) corresponds to: 3.1 per cent. $K_2O$; 3.5 per cent. MnO, 0.83 per cent. ZnO.

(b) Preparation of the xerogel: There are mixed: 200 parts of sodium silicate solution (11.9 per cent. $Na_2O$, 31 per cent. $SiO_2$), 200 parts of pure river sand, 33 parts of $MnCl_2.2H_2O$, dissolved in 165 parts of water.

The hydrogel precipitated by the addition of the Mn-solution is dried in the air at $+50°C$. and finely ground. Xerogel (b) contains manganese corresponding to 6.5 per cent. MnO.

(c) Preparation of the xerogel: There are mixed: 200 parts of sodium silicate solution (11.9 per cent. $Na_2O$, 31 per cent. $SiO_2$), 200 parts of potassium silicate solution (10.7 per cent. $K_2O$, 24 per cent. $SiO_2$), 2 parts of $KMnO_4$, dissolved in 14 parts of water. The above mixture is mixed with a suspension of 8 parts of boric acid ($H_3BO_3$) in 100 parts of water, 100 parts of gypsum in 110 parts of water, while stirring. The hydrogel so formed is dried in the air at $+50°$ C. and ground. Xerogel (c) contains 7.5 per cent. $K_2O$, 0.32 per cent. MnO (calculated as oxides), and 1.6 per cent. $B_2O_3$.

A mixture M is prepared from 100 parts of xerogel (a), 50 parts of xerogel (b), 50 parts of xerogel (c). The mixed xerogel contains: 3.4 per cent. $K_2O$, 3.4 per cent. MnO, 0.41 per cent. ZnO (calculated as oxides) and 0.4 per cent. $B_2O_3$.

The xerogel so obtained is mixed with other xerogels which are prepared as follows:

(d) Preparation of the xerogel: 120 parts of potassium silicate solution (10.7 per cent. $K_2O$, 24 per cent. $SiO_2$), 80 parts of sodium silicate solution (11.9 per cent. $Na_2O$, 31 per cent. $SiO_2$), 40 parts of magnesium carbonate (40 per cent. MgO) are mixed together. The above mixture is added, while stirring, to a mixture prepared of 20 parts of gypsum, 6 parts of $ZnSO_4.7H_2O$, 4 parts of $MgSO_4.7H_2O$, 2 parts of $MgCl_2.6H_2O$, 100 parts of water. Xerogel (d), dried at $+50°$ C. and ground, contains: 10.5 per cent. $K_2O$, 14.5 per cent. MgO, 1.36 per cent. ZnO (calculated as oxides). (e) Preparation of the xerogel: 60 parts of potassium silicate solution (10.7 per cent. $K_2O$, 24 per cent. $SiO_2$), 40 parts of sodium silicate solution (11.9 per cent. $Na_2O$, 31 per cent. $SiO_2$), 10 parts of magnesium carbonate (40 per cent. MgO) are mixed together. To this mixture there is added a solution prepared of 4 parts of $CuSO_4.5H_2O$, 2 parts of $CuCl_2$, 4 parts of $ZnSO_4.7H_2O$, 0.7 part of boric acid ($H_3BO_3$) and 50 parts of water. The xerogel dried at $+50°$ C. and ground contains: 10.5 per cent. $K_2O$, 6.7 per cent. MgO, 3.6 per cent. CuO, 1.8 per cent. ZnO (calculated as oxides), 0.6 per cent. $B_2O_3$.

From the above-mentioned xerogels a highly effective xerogel mixture is obtained (calculated as oxides): 100 parts of xerogel (a) (b) (c)=M with 3.4 per cent. $K_2O$, 3.4 per cent. MnO, 0.41 per cent. ZnO, 0.4 per cent. $B_2O_3$, 150 parts of xerogel (d) with 10.5 per cent. $K_2O$, 14.5 per cent. MgO, 1.36 per cent. ZnO, 50 parts of xerogel (e) with 10.5 per cent. $K_2O$, 6.7 per cent. MgO, 3.6 per cent. CuO, 1.8 per cent. ZnO, 0.6 per cent. $B_2O_3$.

The xerogel mixture, ready for use, contains: 8 per cent. MgO, 8 per cent. $K_2O$, 1.13 per cent. MnO, 1.1 per cent. ZnO, 0.23 per cent. $B_2O_3$, 0.6 per cent. CuO as well as $SiO_2.CO_2$, $SO_4$, $Cl_2$, $H_2O$ and sand. (Metals calculated on the basis of the oxides.)

*Examples 3*

A colloidal xerogel on the basis of a heavy metal complex can be produced in the following manner: 1 part of potassium silicate solution, 1 part of sodium silicate solution, 2 parts of silicon dioxide are precipitated with an aqueous solution of the following salts: 0.5 part of $CaSO_4$, 0.25 part of $MgSO_4$, 0.25 part of $MnSO_4$, 0.25 part of $ZnSO_4$, 0.25 part of $CuSO_4$. The reaction mixture is dried, ground and sieved.

*Example 4*

A colloidal xerogel on a natural silicate basis is obtained according to the following procedure: 1 part of potassium silicate solution, 0.5 part of a high-grade natural silicate formed by sedimentation, 0.5 part of a marine alumina silicate containing nearly all trace metals, are precipitated with an aqueous solution of the following salts: 0.2 part of $MgSO_4$, 0.2 part of $CuSO_4$, 0.2 part of $MnSO_4$, 0.2 part of $ZnSO_4$. The reaction mixture is dried, ground and sieved.

*Example 5*

A xerogel free from easily soluble salts is prepared as follows:

Diluted alkali silicate solution is precipitated, while stirring, with aqueous metal salt solutions equivalent to the alkali content of the alkali silicate solution ($MgSO_4$, $MnSO_4$, $CuSO_4$ and $ZnSO_4$). By filtration and washing the precipitated metal silicates are freed from the main proportion of the solution containing alkali sulfate. The filter cake is then dried and ground.

*Example 6*

(a) A suspension made from 100 parts of fine sand containing marl and 50 parts of sodium silicate solution (11.9 per cent. $Na_2O$, 31 per cent. $SiO_2$) and 50 parts of potassium silicate solution (10.7 per cent. $K_2O$, 24 per cent. $SiO_2$) is treated with an aqueous solution of 1.5 parts of $KMnO_4$. 50 parts of $CaSO_4$ are suspended in water and added to the above suspension, while stirring.

The precipitated substrate forms a soft granulate. (b) A suspension is made from 100 parts of fine sand containing marl as well as from 50 parts of sodium silicate in an aqueous solution and 50 parts of potassium silicate in an aqueous solution. To this suspension another aqueous suspension of 8.5 parts of $MnSO_4$ and 50 parts of $CaSO_4$ is added while stirring.

The precipitated granulate is dried.

The granulates obtained according to (a) and (b) are mixed in equal portions in the dry state.

*Example 7*

85 parts of basic slag rich in calcium silicate are mixed with 15 parts of a xerogel obtainable according to Example 1. The whole is intimately mixed.

*Example 8*

A suspension is prepared from 100 parts of sand, 100 parts of potassium silicate and 3 parts each of copper and zinc carbonate. 0.3 part of phenylacetic anhydride is dissolved in 100 parts of water and added to the aforementioned suspension. Finally 40 parts of $CaSO_4$ are suspended in water and the first suspension is precipitated therewith, while stirring. By filtration and washing of the precipitate a filter cake is obtained which is subsequently dried and ground.

Indolyl acetic anhydride or naphthyl acetic anhydride may be substituted for phenylacetic anhydride.

*Example 9*

Black or white peat is dried, ground and mixed with the substances mentioned under (a) and (b) (quantities in per cent. by weight). (a) 8 per cent. xerogel with about 45 per cent. $SiO_2aq$., 15 per cent. clay, 10 per cent. Mg, 7 per cent. Zn and 5 per cent. Cu. (b) 3.5 per cent. each of magnesium and calcium carbonate or alternatively 7 per cent. dolomitic marl (finely ground). The product is very carefully mixed in the dry state and pressed to form bales.

*Example 10*

Natural silicates such as marly weathered clay or loam, marly fine sand or loess loam are dried, if required, finely ground and the following substances are added: (a) xerogel with 5 per cent. Mn, and 3 per cent. Zn, or (b)

xerogel with 8 per cent. Mg. and 5 per cent. Zn, or (c) xerogel with 8 per cent. Mg, 5 per cent. Zn, and 3 per cent. Cu, or (d) with 2.5 per cent. manganese carbonate and 1.25 per cent. zinc carbonate, or (e) with 2.5 per cent. copper sulfate and 1.25 per cent. zinc sulfate.

Example 11

70 parts of old sea ooze are suspended in an aqueous solution of 30 parts of potassium silicate and precipitated to a xerogel with a mixture of the following metal salts in aqueous solution: 1.5 parts of manganese sulfate, 0.5 part of manganese chloride, 0.5 part of manganese carbonate, 1.25 parts of zinc carbonate, 7.0 parts of magnesium sulfate and 3.0 parts of magnesium chloride.

Example 12

35 parts of old sea ooze and 35 parts of lowland marshy soil are suspended in an aqueous solution of 30 parts of potassium silicate and precipitated to a xerogel with the mixture of metal salts described in Example 11.

Example 13

10 parts of magnesium carbonate which are suspended in 10 parts of water and 1 part of magnesium powder are added, while stirring, to a mixture of 60 parts of potassium silicate in aqueous solution and 40 parts of sodium silicate in aqueous solution.

The mixture is precipitated with the following metal salts in aqueous solution: 10 parts of calcium sulfate, 3 parts of manganese sulphate, 1 part of zinc sulfate.

If required, the water in excess is removed in known manner.

Example 14

5 parts of magnesium carbonate, 0.5 part of magnesium powder, 0.2 part of zinc carbonate, and 0.02 part of zinc powder are added, while stirring, to a mixture of 40 parts of sodium silicate and 60 parts of potassium silicate.

The mixture is precipitated with the following metal salts in aqueous solution: 5 parts of calcium sulfate, 5 parts of manganese sulfate, 3 parts of magnesium chloride, and 2 parts of zinc chloride.

Example 15

To a mixture of 40 parts of sodium silicate and 60 parts of potassium silicate there are added, while stirring: 3 parts of $KMnO_4$ in aqueous solution, 2 parts of magnesium carbonate, 0.5 part of magnesium powder, 0.02 part of zinc powder, 0.01 part of manganese powder. The mixture is precipitated with an aqueous solution of the following metal salts: 10 parts of magnesium sulfate, 3 parts of magnesium chloride, 2 parts of zinc chloride, 1 part of manganese chloride.

Example 16

5 parts of magnesium carbonate, 0.5 part of magnesium powder, 0.2 part of zinc carbonate, 0.02 part of zinc powder are added, while stirring, to a mixture of 33 parts each of sea ooze, peat or peat soil and potassium silicate. The mixture is precipitated with the following metal salts in aqueous solution: 5 parts of calcium sulfate, 5 parts of manganese sulfate, 3 parts of magnesium chloride, 2 parts of zinc chloride.

Example 17

To 100 parts of sea ooze containing about 40–50 per cent. of water the following substances are added, while carefully mixing: 5 parts of magnesium carbonate, 0.5 part of magnesium powder, 0.2 part of zinc carbonate, 0.02 part of zinc powder. The mixture is precipitated with the following metal salts in aqueous solution: 12 parts of calcium sulfate, 5 parts of manganese sulfate, 3 parts of magnesium chloride, 2 parts of zinc chloride.

I claim:

1. The process for the preparation of a xerogel which comprises adding to an aqueous alkali metal silicate solution a salt selected from the group consisting of salts of calcium and magnesium and a further salt selected from the group consisting of salts of manganese, copper and zinc, whereby there is precipitated a hydrogel of the corresponding mixed silicates, and thereafter drying said hydrogel.

2. The process for the preparation of a xerogel which comprises adding to an aqueous alkali metal silicate solution a salt selected from the group consisting of salts of calcium and magnesium, a further salt selected from the group consisting of salts of manganese, copper and zinc, and an alumina-containing silicate, whereby there is precipitated a hydrogel of the corresponding mixed silicates, and thereafter drying said hydrogel.

3. The process for the preparation of a xerogel which comprises adding to an aqueous alkali metal silicate solution a salt selected from the group consisting of salts of calcium and magnesium, a further salt selected from the group consisting of salts of manganese, copper and zinc, and an alumina-containing silicate, whereby there is precipitated a hydrogel of the corresponding mixed silicates, filtering said hydrogel, washing soluble alkali salts from said hydrogel, and thereafter drying said hydrogel.

4. The process for the preparation of a xerogel which comprises adding to an aqueous solution composed of 60 per cent potassium silicate solution (10.7 per cent $K_2O$, 24 per cent $SiO_2$) and 40 per cent sodium silicate solution (11.9 per cent $Na_2O$, 31 per cent $SiO_2$) about 7 parts by weight of magnesium carbonate, about 3 parts by weight of potassium permanganate, about 7 parts by weight of magnesium sulfate, and about 3 parts by weight of magnesium chloride, whereby there is precipitated a hydrogel of potassium, magnesium and manganese silicates.

References Cited in the file of this patent

UNITED STATES PATENTS

| Number | Name | Date |
|---|---|---|
| 1,577,190 | Patrick | Mar. 16, 1926 |
| 1,682,239 | Patrick | Aug. 28, 1928 |
| 1,682,240 | Patrick | Aug. 28, 1928 |
| 1,896,055 | Patrick | Jan. 31, 1933 |
| 1,934,267 | Heyl | Nov. 7, 1933 |
| 1,935,178 | Connolly | Nov. 14, 1933 |
| 2,249,767 | Kistler | July 22, 1941 |
| 2,284,002 | Lontz | May 26, 1942 |
| 2,314,091 | Jones | Mar. 16, 1943 |
| 2,323,583 | Wilson | July 6, 1943 |
| 2,358,202 | Behrman | Sept. 12, 1944 |